United States Patent [19]

Houée et al.

[11] 4,078,158

[45] Mar. 7, 1978

[54] CALL DISTRIBUTING AUTOMATIC TELEPHONE INSTALLATION

[75] Inventors: Yvon Houée, Brest; Claudine Santier, Vertou, both of France

[73] Assignee: Societe Francaise des Telephones Ericsson, Colombes, France

[21] Appl. No.: 722,288

[22] Filed: Sep. 10, 1976

Related U.S. Application Data

[63] Continuation-in-part of Ser. No. 530,005, Dec. 5, 1974, abandoned, which is a continuation-in-part of Ser. No. 322,619, Jan. 11, 1973, abandoned.

[30] Foreign Application Priority Data

Jan. 13, 1972   France ................................. 72.01151

[51] Int. Cl.² ............................................... H04Q 3/66
[52] U.S. Cl. .............................. 179/27 D; 179/18 ES
[58] Field of Search ...................................... 179/27 D

[56] References Cited

U.S. PATENT DOCUMENTS

| | | | |
|---|---|---|---|
| 2,729,705 | 1/1956 | Faulkner | 179/18 GF |
| 3,185,898 | 5/1965 | Ehlschlager | 179/18 GF X |
| 3,626,111 | 12/1971 | DuVal | 179/18 GF X |
| 3,627,954 | 12/1971 | Quinn | 179/18 ES |
| 3,647,979 | 3/1972 | Rubin | 179/18 ES |
| 3,740,485 | 6/1973 | Nickerson | 179/18 AD |
| 3,780,227 | 12/1973 | Pirnie et al. | 179/27 D X |

*Primary Examiner*—William C. Cooper
*Attorney, Agent, or Firm*—Karl W. Flocks

[57] ABSTRACT

An automatic telephone installation applicable to chronological call distributions including a plurality of inputs through junction units to a connection network formed of a switching circuit, a plurality of switching position stations, operator stations and outgoing junction units connected to said switching circuit and the outputs of which constitute the outputs of said installation, and a central processor comprising a memory with a stored program. The installation permits a flexible operation namely for reservation purposes together with a printing of all useful statistical data.

6 Claims, 11 Drawing Figures

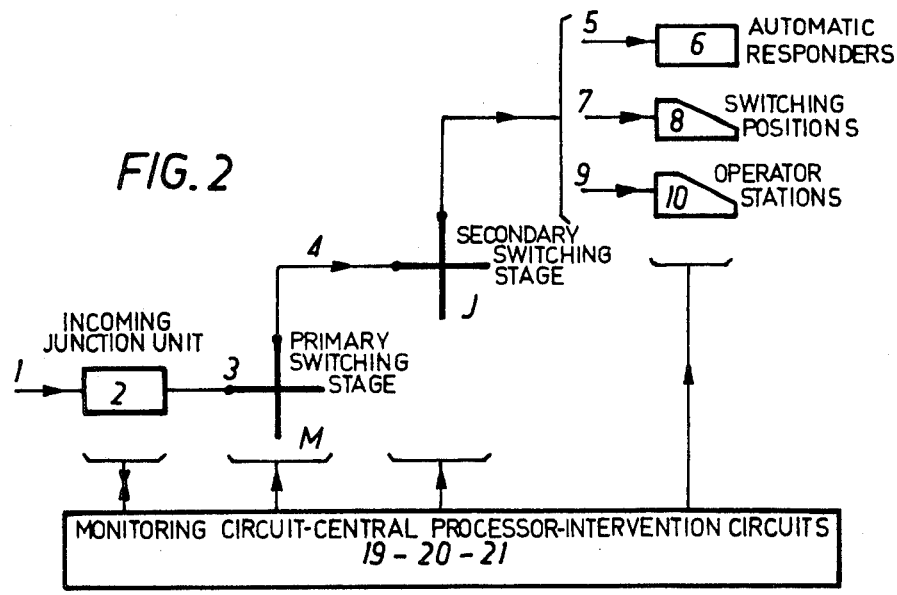
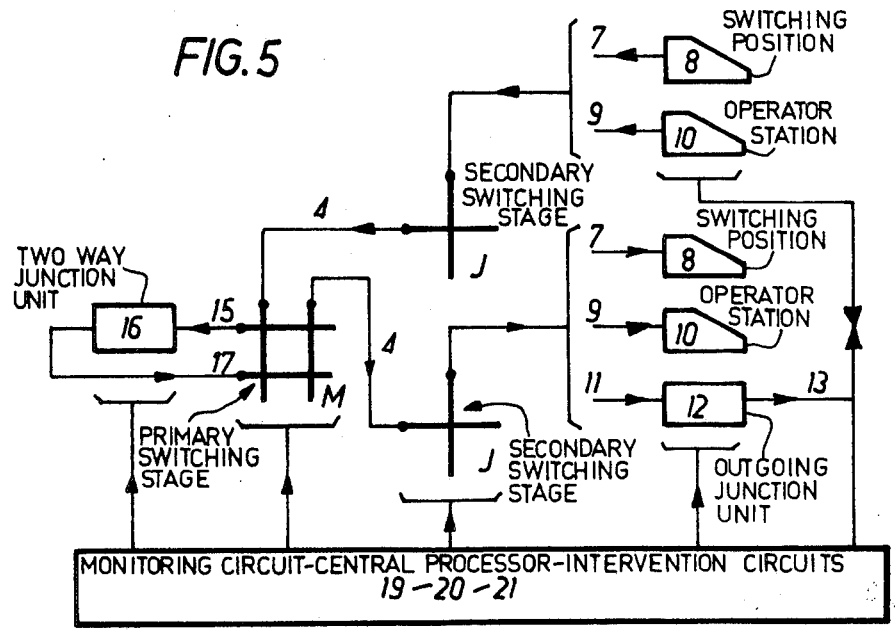

CALL DISTRIBUTING AUTOMATIC TELEPHONE INSTALLATION

This application is a continuation-in-part of application Ser. No. 530,005 filed on Dec. 5, 1974, now abandoned, which is a continuation-in-part of Ser. no. 322,619 filed on Jan. 11, 1973 now abandoned.

The present invention relates to an automatic telephone installation of the stored program type, intended more particularly for the chronological distribution of incoming calls to operators' stations grouped by functional category.

Current installations of the "reservation" type permit:

either the distribution of communications between a caller and a "reservation agent", the latter being able through an associated automatic exchange to communicate with one another by call or enquiry and acquire an outgoing junction or enquiry to an administrative automatic exchange. Agents can likewise transfer an incoming communication following an enquiry or assign it for distribution to another group. All these operations involve a control console with lamp-buttons, an operator-station circuit to indicate the status of the buttons and lamps, circuits common to a plurality of operator stations, a marking circuit, a wired-program electronic processing unit, an incoming electro-mechanical chain and an automatic exchange associated to the reservation system;

or an automatic service, with certain "network" circuits specific to a given direction and connected directly to stations for processing that direction, the remaining "network" circuits being identical and terminating only on so-called switching positions the main function of which is to distribute them to the different sectors of the reservation system.

An installation according to this invention permits more flexible operation when applied for reservation purposes and further permits displaying, printing on a base paper, and/or collecting on punched tape all statistical data useful for management and supervision of the overall system.

A telephone installation according to the invention, applicable for call distributions, is essentially characterized by the fact that it includes, in combination:

A plurality of identical inputs which can for that reason be connected to a single connection network capable of completing several connections at one time, through the intermediary of call junction units and also of enquiry junction units, this single connection network being constituted by a primary switching stage and a secondary switching stage;

A plurality of answering circuits of a different nature, the inputs of which are respectively connected to the outputs of the secondary switching stage, their outputs, which form the installation outputs, being all identical;

The answering circuits are:

standard operator stations;

stations known as switching stations since the operators placed at these stations have different possibilities of utilization permitting for example the switching of incoming calls to the services concerned or available;

outgoing junction units for passing the outgoing calls out of the installation, and finally, recorders which indicate to the subscriber the phase which has been reached by the exploitation of his call, for example waiting, holding . . .

A central processor with stored program, connected to said junction units for call and enquiry, so-called input junction units, to said switching stages and to said plurality of circuits.

In accordance with further particularities of the invention the central Unit is connected to the input junction units, to the primary and secondary stages of the connection network, and also to the said plurality of circuits through the intermediary of circuits known as intervention circuits and marking channels, the function and the structure of which will be described in more detail below;

the central unit comprises a clock, a central memory explored periodically, two identical program units, two calculating units controlled by the said programs, a comparison element for checking the identity of operation of the two calculating units, and a monitor which chooses the program to be carried out as a function of the state recorded in the central memory of the peripheral electro-mechanical equipments, input junction units and answering circuits;

the installation includes a control circuit monitoring and selection element connected, on the one hand, to the input junction units and to the switching stages and, on the other, to the central processor;

the monitoring element preferably consists of a matrix test circuit comprising diodes connected to the contacts to be monitored and to detectors for translating the status of said contacts into the binary code, which circuit is associated with a buffer;

the central processor is programmed by means of a data transmitting peripheral equipment;

the installation further includes a traffic monitoring statistical element connected, on the one hand, to the processor memory and the programming peripheral equipment, and on the other to a supervising console and to a peripheral equipment for printing out data useful for overall management;

the supervisory desk comprises a display device, a count selection device and a unit of operating buttons;

the statistical traffic observation member comprises memories in which are stored the programs and data used in counting, a control device for the display and logical circuits for controlling the bringing up-to-date of the counts and the display;

the installation additionally includes both way trunk lines connected to an input junction unit via an output junction unit, the latter being controlled by said input junction unit in order that these lines may be employed equally well for outgoing as incoming, depending on the needs of the installation.

An installation according to the invention forms a chronological call distributing system usable for reservation purposes and endowed with great operational flexibility by virtue of its stored-program central processor which allows modifying operation of the system at any time. The supervising of the stored-program traffic monitoring function permits cyclic print-outs on a base paper and/or punched tape of the status of the integrating and/or partial counters containing the data needed for proper dispatching of the traffic and for statistical management. These various data are read in the central memory and/or in the calculation units. The nature of these data is defined by the stored-program. It is at all times possible to interrogate the traffic monitoring system to obtain the status of each counter.

The single two-stage connection network permits serving call demands, call and enquiry between operators of different categories, call and enquiry with one or more remote telephone installations, call transfers subsequent to an enquiry, overflows onto one or more switching positions and connection to one or more automatic responder systems.

All these operations correspond to recorded programs. Each of them is started by a "program position", that is to say by a change of state or a combination of changes of state of the peripheral circuits observed by the test circuit.

The central processor directly and cyclically explores the status of the buttons on the operators' consoles via a diode matrix system constituting the monitoring element. This compact system allows simplifying presently known operator-station circuits by virtually making them voice circuits. The circuits common to the operator stations are eliminated. The interface and control functions usually obtained in these circuits common to the stations are grouped together for the whole of the operator stations, switching stations, recorders and outgoing junction units, in the intervention circuit which works very rapidly. The operator stations, switching stations, automatic responders and outgoing junction units are identical and differ only in a set of recorded categories (128 in the exemplary application given hereinafter). The various categories are grouped together by functions. There are as many directory numbers as there are groups. The groups are constituted by assemblies of incoming junction units or operator stations . . . etc. of the same category. The Central Unit has in its memory the categories of the various circuits.

The recorders operate so as to relieve momentarily an overloaded category.

Further particularities and advantages of the present invention will become more clearly apparent from the description which follows with reference to the accompanying non-limitative exemplary drawings, in which:

FIG. 2 is a functional schematic diagram illustrating establishment of a communication reaching an operator station, the switching position or an automatic responder;

FIG. 5 is a functional diagram illustrating establishment of a call leaving an operator station for a switching position, an operator station of different functional category, or an adapted outgoing junction unit, capable of being connected to any remote or non-remote automatic telephone installation;

Figure 1:
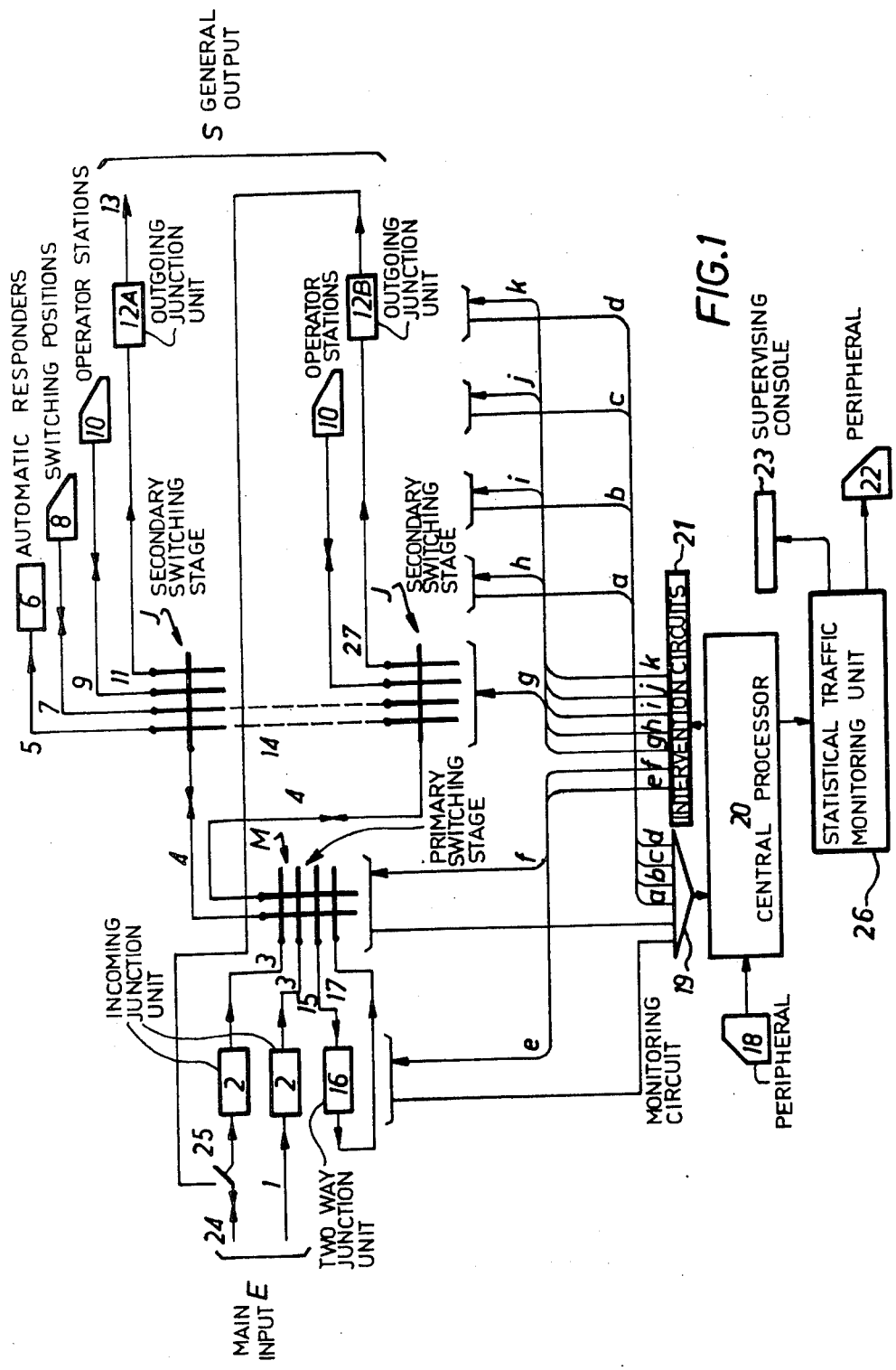
FIG. 1 is an overall schematic diagram of a possible embodiment of an installation according to the invention.
Figure 6:
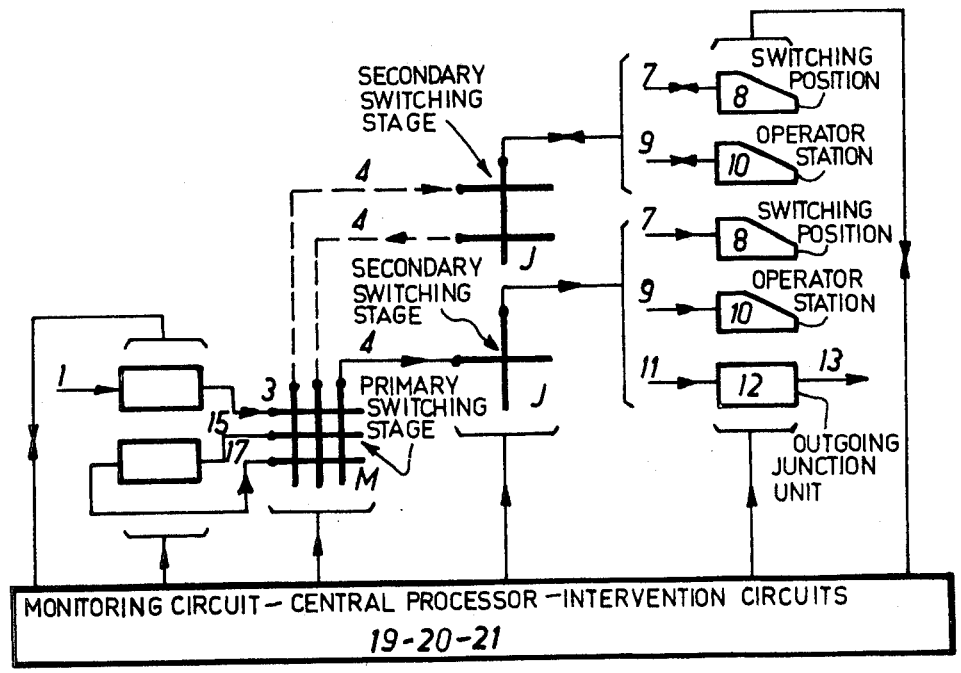
FIG. 6 represents a functional diagram illustrating establishment of an enquiry communication capable of being followed by a "transfer"

For greater clarity, the components 19, 20 and 21 of FIG. 1 are shown grouped together on FIGS. 2, 5, and 6, like parts being designated by like reference numerals on all the figures.

Reference is first made to FIGS. 1 and 2, on which it will be seen that, from a main input E, an incoming network line 1 has access to the installation via an incoming junction unit 2 of programmed category corresponding to functional groups.

The purpose of this junction unit is:

(a) to detect incoming calls and communicate them to the central processor; in the exemplary application of this invention, this exchange of information is effected by means of a three-dimensional matrix 19 which will be described in greater detail hereinafter with reference to FIG. 7;

(b) upon a command from the central processor, to switch to the conversation position and thereby cut off the ringing device;

(c) upon command from the central processor, to switch to the stand-by position with respect to the input network; to this end, without breaking them, it switches the two speech wires of the input network to the primary winding of a transformer, whereupon the subscriber hears a stand-by tone which can be emitted by a tape recorder.

Input junction unit 2 is connected to an input 3 of the primary switching stage M which, with secondary switching stage J, forms the single connection network. Input 3 is distributed by a horizontal-vertical matrix system to all the outputs 4 of the corresponding group of lines. Each of these outputs 4 can be wired to any one of the inputs of secondary switching stage J. The image of the mixing of the links is recorded in the central memory.

In the exemplary embodiment described herein, the availability of the links connecting primary switching stage M to secondary switching stage J is given by the status of the output of the corresponding primary stage M. The stage-J outputs are identical and, depending upon their categories assigned by the central processor program, can reach:

the outputs 5 of recorders 6;

the outputs 7 of switching positions 8;

the outputs 9 of operator stations 10 grouped by functional category;

the outputs 11 of outgoing junction units 12A being able to reach one or more conventional telephone installations via outgoing line 13.

The outputs 27 of the outgoing junction units 12B can reach the mixed line 24 through the intermediary of the contact 25 of an incoming junction unit relay which is not utilized in the particular case where an excess of outgoing traffic exists with respect to the incoming traffic.

Depending on the program stored in the central processor, the recorders 6 can answer an incoming call and release the link at the end of the message (in the case of a night recorder) and/or answer a normal incoming call and, at the end of the message, assign the call to a group of operator stations of programmed categories in the central processor, and/or answer a call transferred to a saturated group of operator stations and, at the end of the message, place this call on stand-by with a serial number on the waiting list to permit chronological serving of such calls.

Depending on the program stored in the central processor, the switching positions 8 can receive normal incoming calls from input junction units of the same category as their own; receive overflow calls from input junction units of different categories (programmed in the central processor) reaching a saturated group of operators; receive "overflow return" calls, i.e. incoming calls already processed by an operator and switched to a saturated group of operators; and receive calls from operators. Each such position can handle each of these calls and then release them or switch them to an orderly waiting list of any one of the groups of operators or outgoing junction units of the installation. They are able furthermore to revert, by appropriate addressing, to any one of the calls placed on a waiting list, and either leave it in its place on the list of the original category to which it was switched or move it to a different saturated or non-saturated category of operator group. In the event that the further switch ends up in an already-saturated category, the call being switched places itself in its new handling order.

Depending on the program stored in the central processor, each switching position, like each operator station, can set up a call or enquiry to any category of operator station or outgoing junction unit. In the event of an enquiry the latter can be followed by a transfer of the incoming communication.

Depending on the program stored in the central processor, the operator stations 10 can receive either external calls (processing of arrived communications) or internal calls (e.g. for an information function), or both types of calls. They can process these calls, make two-way calls reciprocal stand-by, and effect transfers to outgoing junction units or to groups of operator stations of different category from their own.

Depending on the program stored in the central processor, the outgoing junction units 12A. 12B can reach one or more remote or non-remote conventional telephone installation via line 13 of general output S. They may or may not authorize the transfer operation, depending on their stored category. They also transmit the dialling or keyboard numbering by a suitable system which retransmits the dialling via relays.

The installation is controlled by a central unit 20 which will be described in more detail below with reference to FIG. 3, with a memory programmed by means of a peripheral equipment 18 which may be a punched tape or card reader, a teleprinter, or any other data input unit. The central processor is connected to the input junction units, to switching stages M and J, to the operator station, recorders, switching position and outgoing junction unit circuits, and more generally to all the peripheral equipments used for switching via marking channels $e$ to $k$ controlled by a set of intervention circuits 21 which will be described in more detail later, with reference to FIG. 4.

Figure 3:
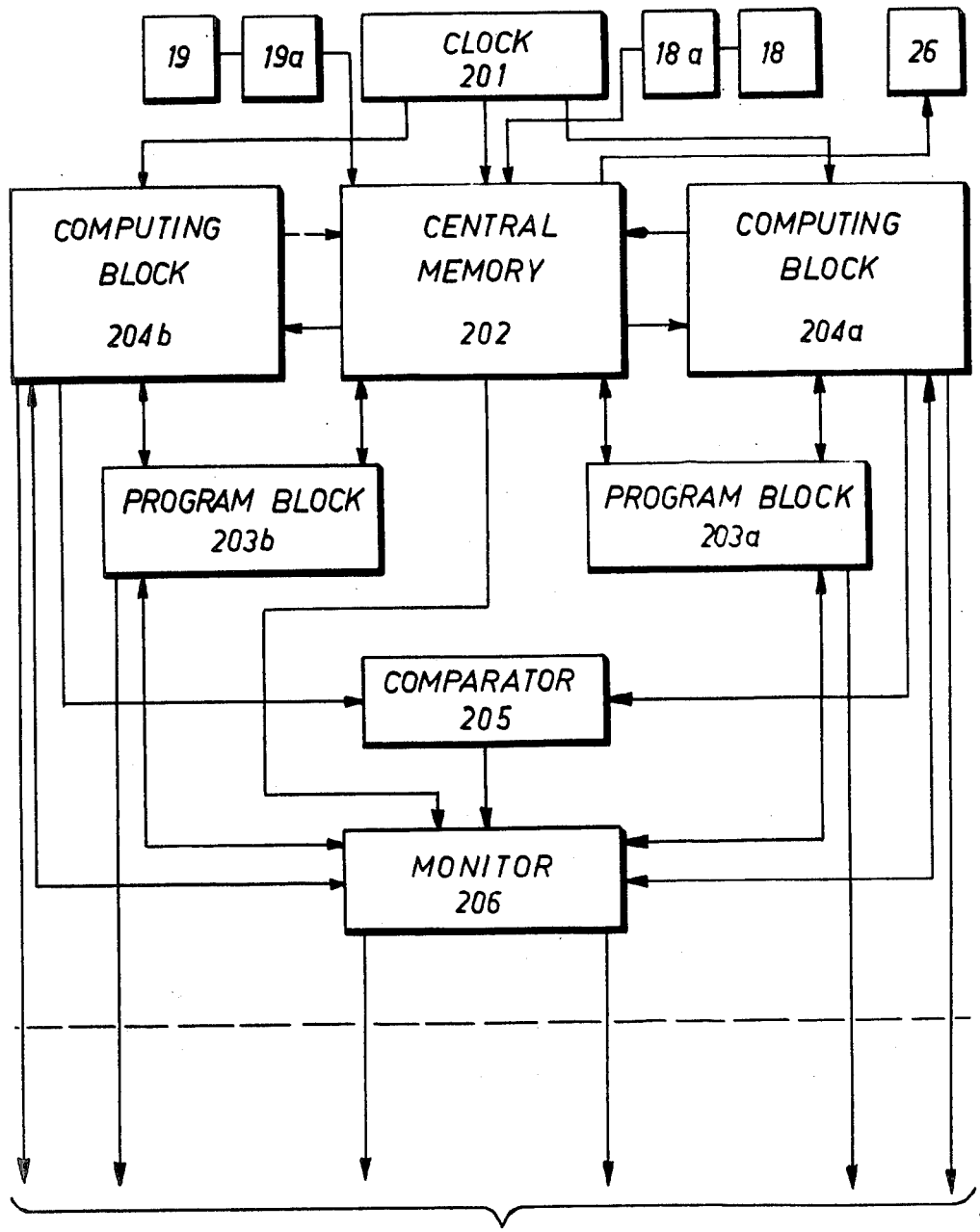
FIG. 3 shows diagrammatically one possible form of construction of the central unit of an installation according to the invention.

Referring to FIG. 3, the central treatment unit 20 comprises a clock 201, a central memory 202, two program units 203a and 203b, two calculating units 204a and 204b, a comparison element 205 and a so-called monitor circuit 206, the function of which will be described below.

The central memory 202 is connected to the matrix test circuit 19 through the intermediary of an adaptation logic 19a, to the peripheral equipment 18 by means of an interface circuit 18a, and to the statistical traffic observation member 26.

The clock 201 is an impulse generator built in an integrated circuit in known manner, designed so as to define:

the synchronizing pulses necessary especially for the central memory 202 and to the calculation units 204a and 204b so as to determine the rhythm of working of the Central Unit, the binary elements defining the memory addresses of the explored zones, periods of time corresponding to various time delays useful to the various logic circuits, decoding of the addresses indicating the nature of the address explored corresponding to a junction unit, a link, a station . . .

The clock is duplicated for reasons of safety and a conventional system of fault detection causes the triggering of the defective clock on the other.

The central memory 202 is a random access memory of any known type, for example with semi-conductors or ferrite rings. It is single and is divided into zones in which are stored the tates of the various elements of the connection system, for example connectors, links and conversation circuits.

Each zone comprises:

a "data memory" portion, in which are recorded the permanent data of the element, for example for a junction unit its category, for the links the image of the mixing is recorded on the whole of this memory, and a switching memory portion, in which are recorded momentarily the data necessary for the current utilization, for example "the program position" defining the phase of the utilization, the address of the element or elements with which it works, the number of returns which have already been made . . . and the data necessary for the metering.

This memory is explored cyclically by means of the clock, in order to bring up-to-date the variable data of the zones and to reedit the permanent data. This cyclic exploration can be interrupted momentarily for a cycle following an addressing asked for by program from the calculation units 204a and 204b. This interruption is effected for example by means of an impulse defining the validation of the memory addressing, applied at the output of the generator 201.

It may be read indifferently by either of the calculating units, but only one unit can write an entry, for example the calculating unit 204a. In the event of a failure of the calculating unit 204a, the possibility of writing in the central memory is transferred, by any known means, to the calculating unit 204b.

Each calculation unit contains various registers comprising the information necessary for a definite utilization: junction-unit registers, station registers, display registers . . . constituted by one or several trigger devices and standard cabled and integrated logic circuits permitting re-setting to zero, validations, route-switching, triggering by the possibility of writing in the central memory by the other unit 204b if the unit 204a is out of order, and also the logic circuits making it possible to carry out displacements, additions and comparisons following conventional methods.

The two calculating units 204a and 204b are identical and carry out simultaneously the same work, controlled by the programs contained in the program units 203a and 203b. The result of their work is sent to the intervention circuits 21.

Each program unit 203a or 203b is constituted by a read-only memory, for example with semi-conductors and by a cabled logic circuit in which are entered the programs necessary to the operation of the central unit 20. The two program units 203a and 203b are identical and contain the same programs, for example connection programs for a junction unit, a station, transfer, enquiry, a held call, numbering taken from a line, return, switching position, enquiry return . . .

Figure 10:
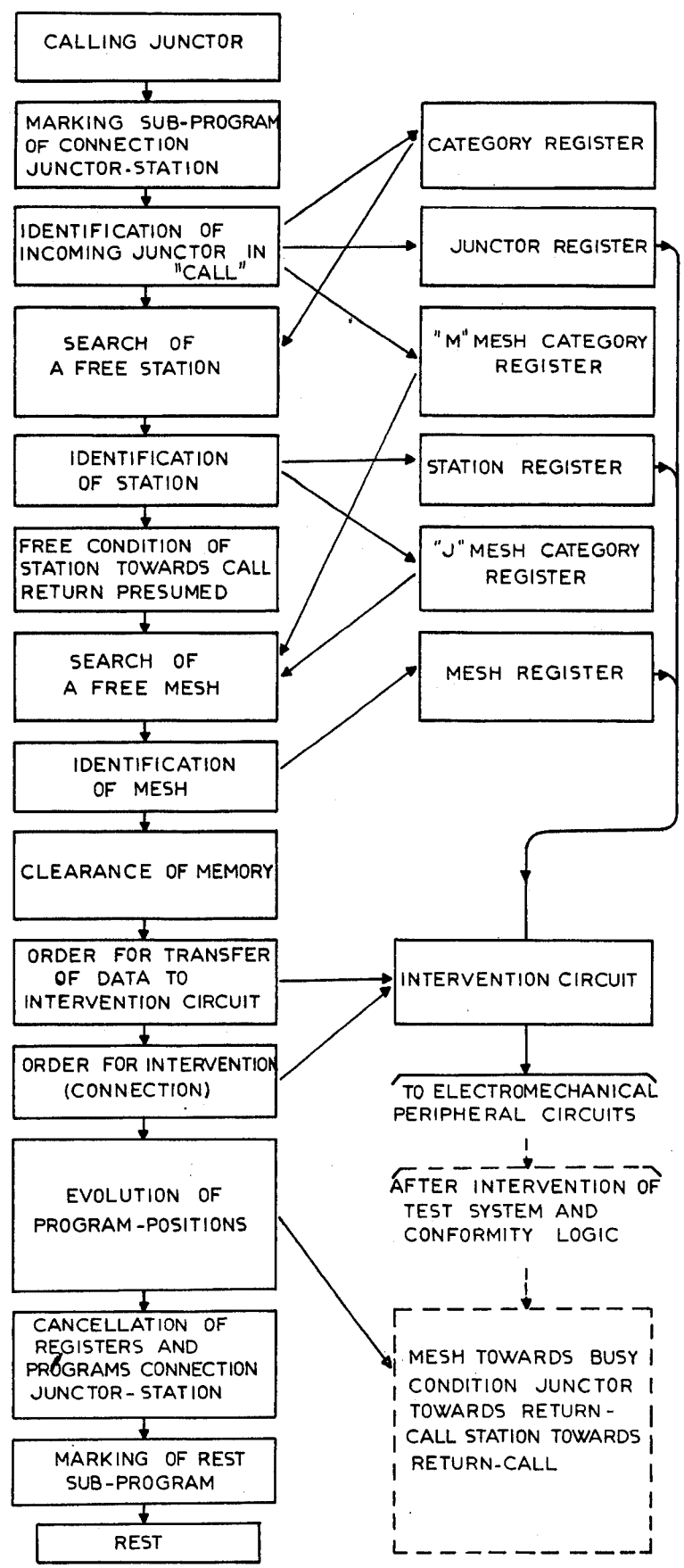
FIG. 10 is a simplified flow-chart of the sub-program of connection of a junction unit with a station.

The flow-chart of the first program cited is given in FIG. 10. The comparison element 205 is a cabled logic circuit which controls the reading and writing of the identity of information between the two calculation units. The output of this element is coupled to the monitor 206 described below.

The monitor 206 has the purpose of governing the priorities permitting the tripping of the various programs as a function of demands which correspond to evolutions of program positions. Thus, if the central unit simultaneously receives a demand for "return", two demands for "transfer" and a demand for "liberation", and if the rotating priority of the "monitor" is positioned in such manner as to favour the "return" first, the programs asked for will be treated in the following order: the "return", a "transfer", the liberation and finally the second transfer.

It will thus be observed that the programs are treated cyclically and that the same program can only be released twice consecutively if it is the only one demanded.

Figure 11:
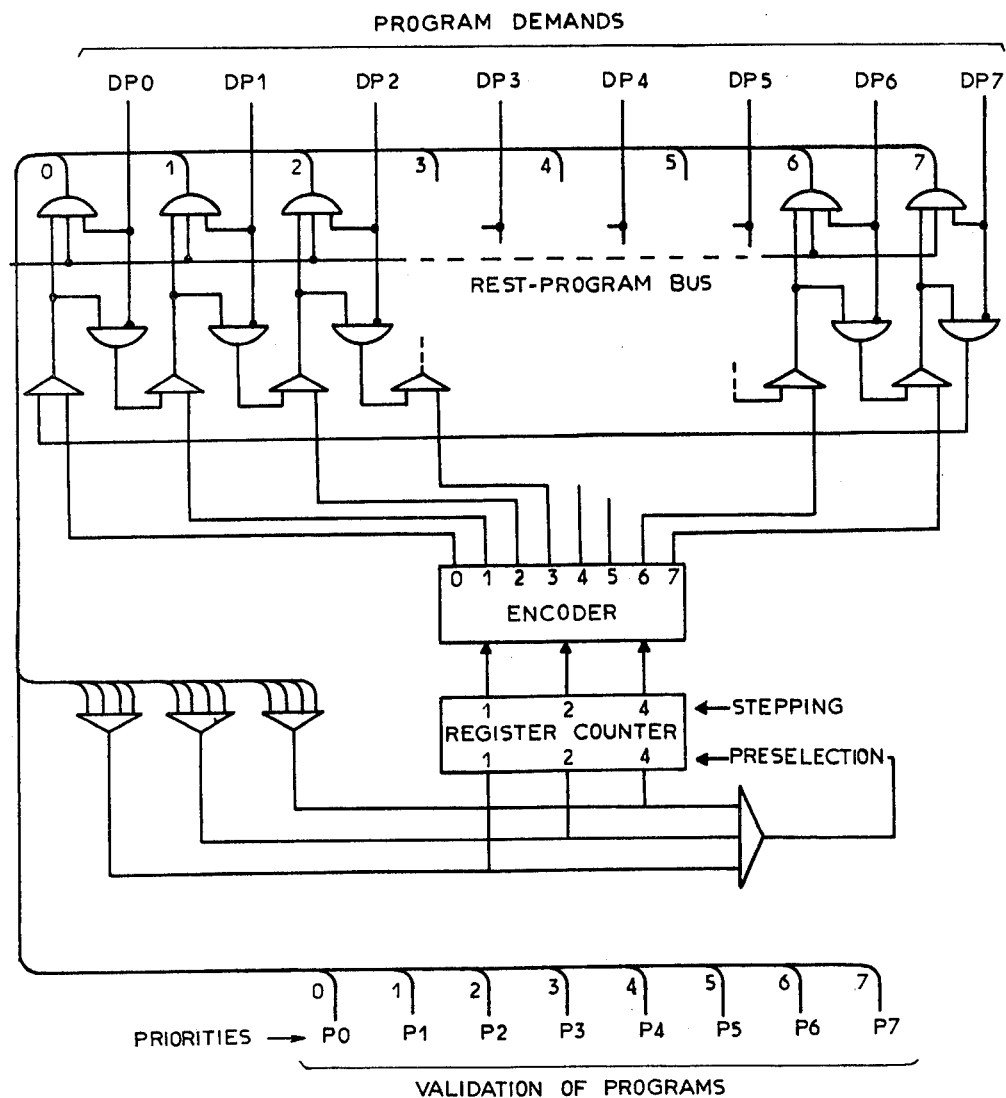
FIG. 11 is the basic diagram of the monitor.

The principle of operation of the "monitor" is shown in a simplified manner in FIG. 11. It is constituted by wired logical elements and comprises a coding device and a register counter. The program demands come in over the wires "DP" and permit the validation of the corresponding priority, inhibiting the progress of the system of rotating priority. If the sub-program "rest" is marked, any program demand is immediately taken into account. The register counter memorizes the row of the priority validated and at the next passage to the sub-program "rest", the register counter will advance by + 1 and will thus favour the program demands corresponding to the following "priorities". The list of priorities and of the corresponding programs is shown on the attached Table.

Each calculating unit 204a or 204b contains registers and logic circuits enabling shifts, additions and comparisons to be effected following conventional methods. The two calculation units 204a and 204b are identical and carry out simultaneously the same work, controlled by the programs contained in the program units 203a and 203b. The result of their work is sent to the intervention circuits 21.

The comparison element 205 compares the treatments carried out by the calculation units 204a and 204b and verifies that these treatments are identical. The monitor 206 establishes the priorities between the various programs to be carried out, and initiates these programs according to the modifications of the state of the peripheral circuits stored in the central memory 202.

The elements of the central unit 20, coupled directly to the intervention circuits 21, are the program units 203a and 203b, the calculation units 204a and 204b and the monitor 206. The program units indicate to the intervention circuits the nature of the order to be executed, the calculation units indicate to them the element or elements of the connection system on which the order is to be carried out, and the monitor selects that of the two intervention circuits which is to carry out the order.

Figure 4:
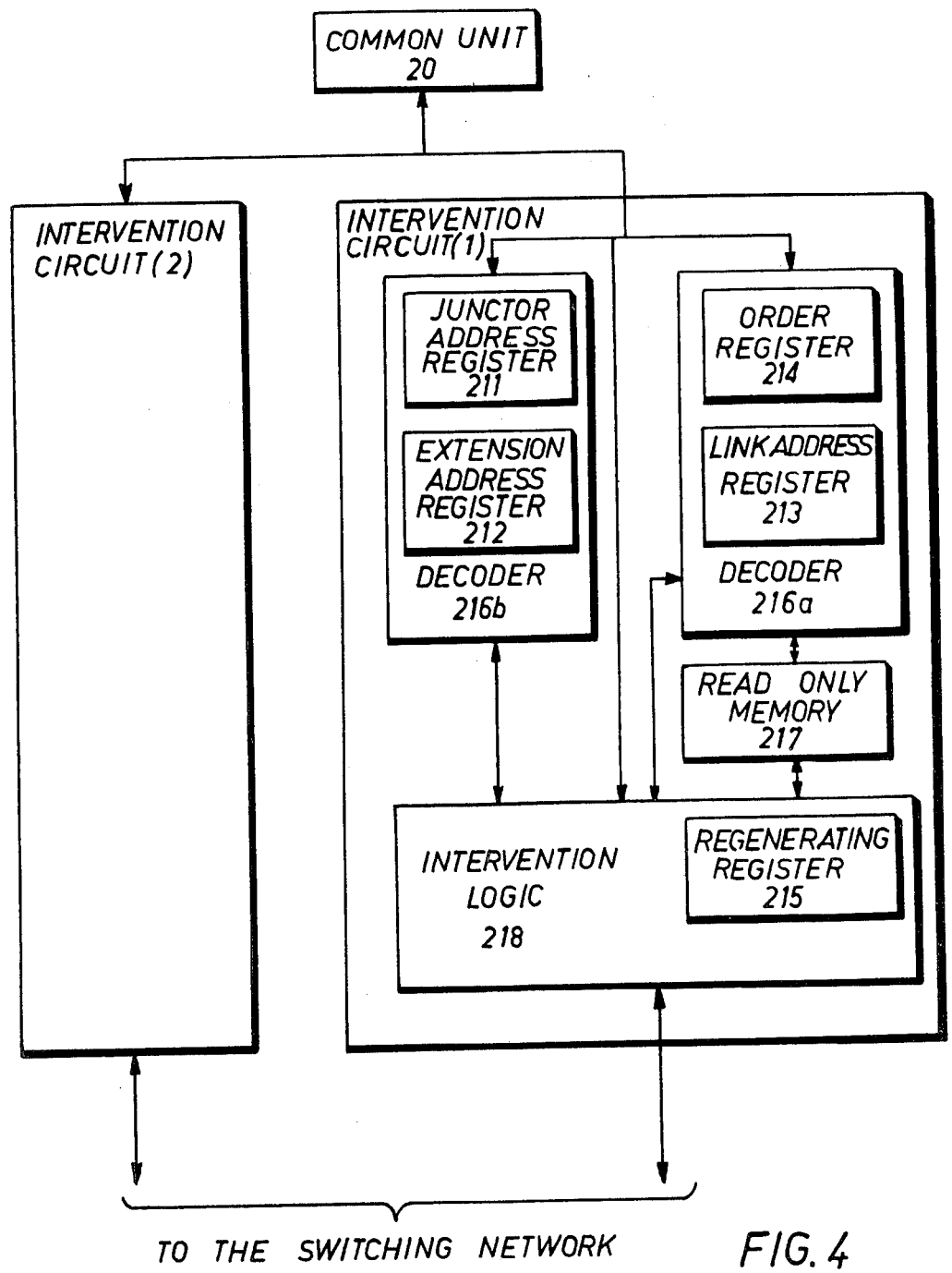
FIG. 4 shows diagrammatically a group of two intervention circuits included in an installation according to the invention.

FIG. 4 shows a group of two intervention circuits 21. As the two circuits are identical, only one has been shown in order to clarify the drawing. Each intervention circuit comprises registers 211 to 215, decoders 216a and 216b, a read only memory 217 and an intervention logic 218.

The memory 217 is a read-only memory, with semiconductors for example. In this memory are entered cabled micro-programs corresponding to different repetitive stages and the various relays to be controlled for a given order. The registers 211 to 215 are of any known type, for example with semi-conductors. They comprise different information according to their nature: order registers 214, address registers 211 to 213, regeneration registers 215.

The order register 214 is a displacement register. Each output of this register addresses a line of the memory 217 corresponding to a definite intervention. In the case of an intervention with several cycles, the passage from one cycle to the next is effected by displacement of a unit in the displacement register in order to address the following line of the memory 217.

In the address registers for junction units 211, station 212 or links 213, the central unit enters the address of the junction unit, the station or the link concerned by the intervention, in the binary form.

In the regeneration register 215 are entered the states of the relays of the connection network which have just been addressed and this makes it possible to avoid the reproduction of certain information necessary for the entire duration of an intervention. The information contained in this register is only modified after the intervention has been physically completed on the peripherals. For that purpose, the regeneration register is coupled to the liberating relays of the peripheral circuits which verify that the marking channels are available and that the order can be sent.

The decoders 216a and 216b are associated with the registers 213, 214, and 211, 212 respectively. On the one hand, they enable the binary information contained in the registers to be translated to information corresponding to the physical position of the circuit, for example for a junction unit, the address of the bay, of the group of junction units in the bay and of the junction unit in its group. On the other hand, the decoders verify the imparity of the addresses contained in the registers and that there effectively exists a circuit corresponding to the address, for example that at the address entered in a junction unit register, there effectively exists a junction unit.

The validated and decoded addresses are sent to the connection network by means of the intervention logic 218.

The intervention logic 218 is composed of a synchronizer and various logic circuits. The synchronizer establishes the succession in time of the orders to be carried out. It is asynchronous to the central unit.

For example, in order to close a contact of a switch, the synchronizer will indicate first the marking of a horizontal line and then a vertical line of this switch. It synchronizes the various operations corresponding to an intervention. The various logic circuits deliver the validation information necessary for an intervention.

The various logic circuits effect the logic coupling between the registers, the memory and the decoders. They are constituted by wired logical elements. The intervention logic receives the orders coming from the address register, checked and transcoded, and issues the orders to the connection network through the marking channels, the addresses being entered in the address registers.

In addition, a logic circuit is provided so as to receive an information indicating that the order has been carried out at the level of the peripheral. This logic circuit permits the forward movement of the order register if the operation effected is not the last of the cycle.

If on the contrary the cycle is completed, the intervention logic cancels the validation signals in order to interrupt the emission of the orders and the addresses towards the connection network and in consequence effects the wipe-out of the registers.

The marking channels constitute the physical connection between the logic intervention 21 and the electromechanical peripherals. They thus convey the order information in the form of three addresses issued by the decoders and then validated (as indicated above for a junction unit: address of bay, of group in the bay and number in the group) enabling them to select a peripheral in three stages.

FIG. 5 represents a functional diagram illustrating a call. The call from an operator station 10 or a switching position 8 passes through the secondary group sectionalizer J, then the primary sectionalizer M, and thereafter issues over an M-input 15 into a junction unit for enquiry 16. The latter has an output 17 onto a second M-input which can be treated as a normal input connection. The entire test on the call operation, the call category, the itinerary, the unit availability and all connection commands are controlled by central processor 20. This principle allows to render identical the M-inputs and the J-outputs.

The enquiry (FIG. 6) from an operator station 10 or a switching position 8 takes place, following a normal "incoming" call defined by an input 1, and input junction unit 2, a horizontal 3 of stage M, a mesh 4, an output 7 or 9 of stage J, an operator console 10 or a switching position 8.

The registering of said enquiry operation is similar to that of the call described precedingly.

Since the call is defined by operator station 10 or switching position 8, outputs 7 or 9 of stage J, a link 4, an M-input 15, a junction unit for enquiry 16, an M-stage input 17, a link 4, an output 7, 9 or 11 of J, an operator station 10, a switching position 8 or an outgoing junction unit 12 issuing over line 13 to a distant link capable of being connected to the public network, an administration automatic exchange, a direct line, etc., the fundamental difference between these two types of call emerges when the connection is made. For once all these data have been selected by the central processor, the latter sets input junction unit 2 of the first link on stand-by by transmitting, to the calling subscriber, a stand-by tone that can be generated by a tape-recorder or any other sound or musical source, sets the link 4 connecting this junction unit to stage J in the "reserved" position and then issues the command for connection to all the units concerned by the call.

For the return subsequent to an enquiry (FIG. 6), following an enquiry operation, the operator can revert to the "incoming" communication. To this end, central processor 20 sets the link 4 connecting stage J to input 15 of stage M in the "reserved position", puts out the stand-by command to junction unit for enquiry 16 and reconnects the input junction unit 2 initially on stand-by, as well as the link 4 reserved for that link.

The operator is thus able to revert from one communication to the other as desired.

The operator can then free one or the other of the links. In that case central processor 20 gives the necessary commands so that the operator is automatically connected to the remaining link. The operator can then relinquish the last link whenever desired, or establish a further enquiry.

A "transfer" (FIG. 6) is permissible depending on the program recorded in the processor. When it is authorized, it is invariably performed subsequent to an enquiry. Having carried out the enquiry operation described precedingly, the operator can request transfer of the communication which has "arrived" on the operator station or the outgoing junction unit acquired in the enquiry mode, to the central processor. The latter then seeks out all elements required for the new connection, sets the input junction unit on stand-by, breaks the "incoming" and "outgoing" chains, and gives the connection commands needed to establish the new chain defined by input junction unit 2, input 3 of M, link 4, stage J, output 7, 9 or 11, operator station 10, switching position 8 or outgoing junction unit 12.

Should a momentary saturation of the connection network make it possible to find an available link 4 capable of establishing the link, the operator is maintained in the enquiry position. The installation according to this invention further allows using both way trunk lines 24 (FIG. 1) controlled at 25 by part of the input junction unit 2, whereupon a category outgoing junction unit 12 interdicting the transfer can become the caller on the network.

Figure 7:
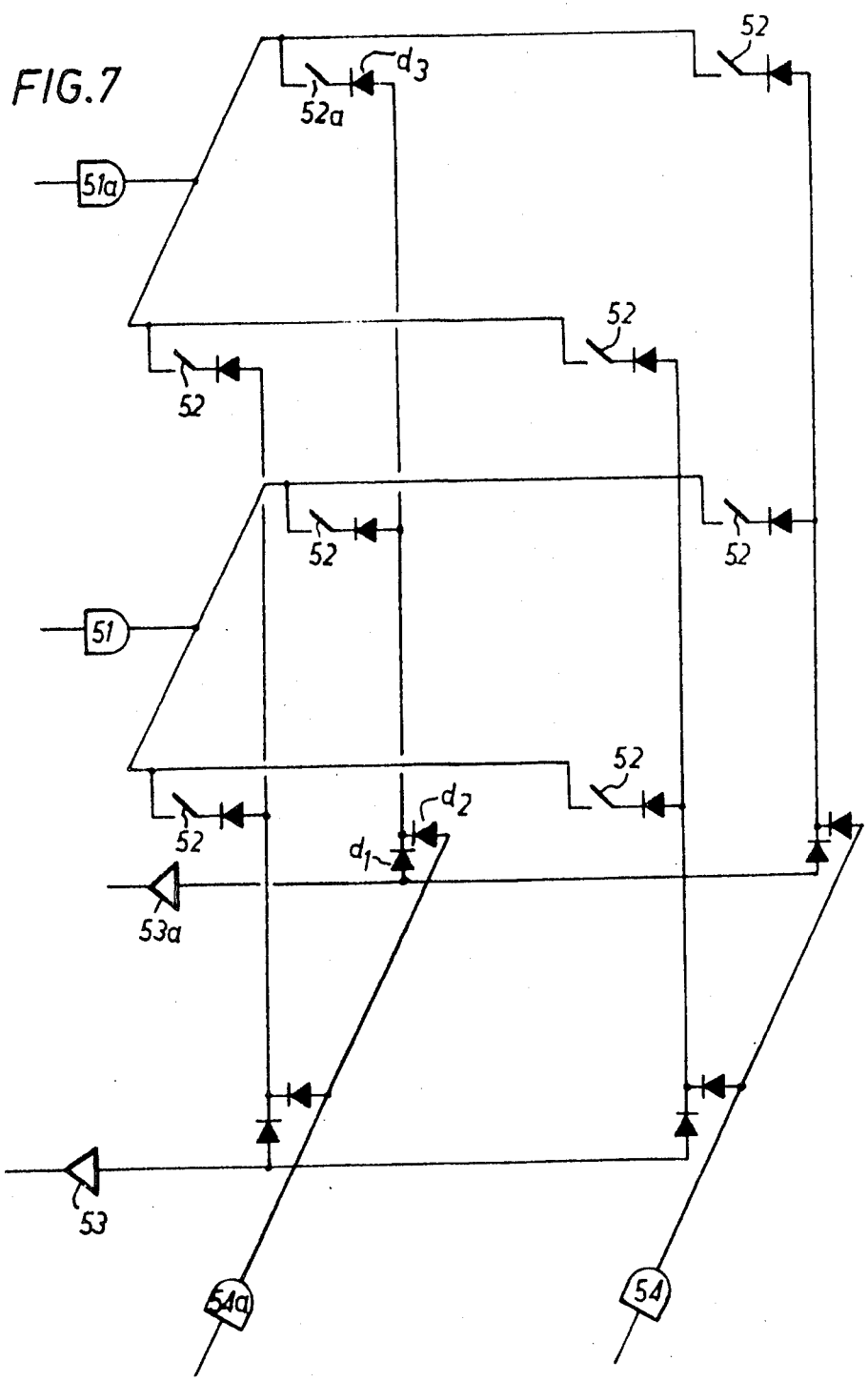
FIG. 7 illustrates the underlying principle of the matrix test on the status of the operator console buttons, the status of the junction units, of the networks, etc.

Referring now to FIG. 7, the observation circuit 19 is constituted by a matrix assembly with diodes, of cubic structure, enabling a group of contacts to be watched. It also comprises a test logic.

The test logic comprises circuits supplying the logic orders and the validations necessary for the matrix assembly and also a life memory momentarily recording changes of state observed.

Figure 9:
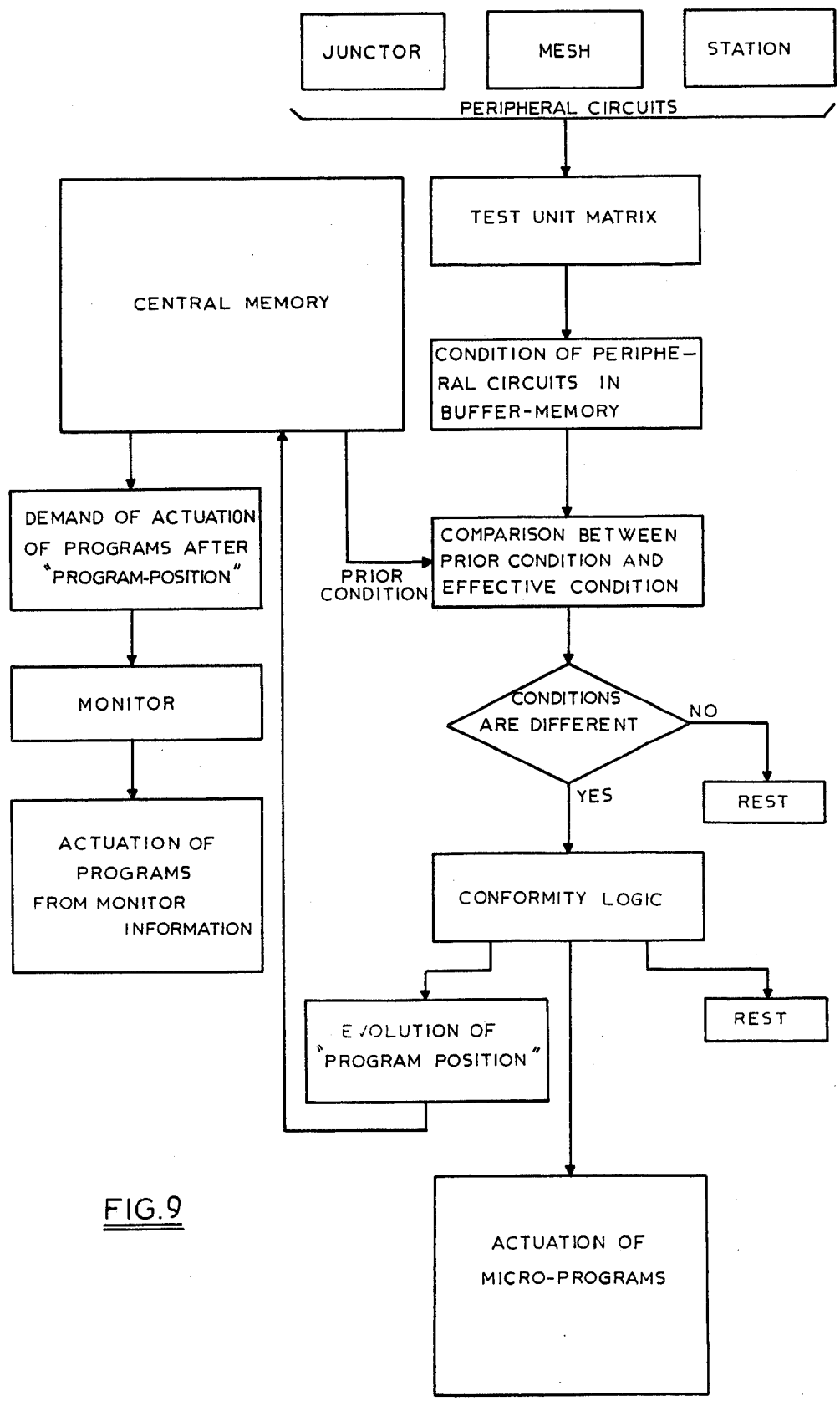
FIG. 9 is a flow-chart detailing the various cases of releasing a program.

The function of this memory will be clearly brought out during the description of FIG. 9. The matrix assembly proper is described below with reference to FIG. 7.

All the contacts to be monitored located in the connection network are included in a circuit which can be represented diagrammatically as an assembly of planes. Each contact 52 is located at the intersection of three planes: a plane, such as represented horizontally in FIG. 7, operated by a control circuit 51, a plane operated by a control circuit 54 and a plane monitored by a detector 53.

The planes defined by the control circuits 51, the control circuits 54 and the detectors 53 are shown parallel to each other respectively. For example, the contact 52a is located at the intersection of the planes defined by the control circuits 51a and 54a, and by the detector 53a.

Each detector 53 applies on the plane which it defines a positive voltage, for example + 10 V in one example of embodiment of the invention. These are circuits capable of detecting that they are traversed by a current and notifying the central processor 20 of this fact.

In order to monitor a contact 52a, the central processor addresses the planes defined by the control circuits 51a and 54a, the detectors 53 then indicating the state of all the contacts 52 located at the intersection of the addressed planes. In particular, the detector 53a indicates the state of the contact 52a. When a plane is not addressed, the corresponding control circuit transmits to this plane a positive voltage higher than the voltage transmitted by the detectors 53, for example + 12 V in the example described.

If one or the other of the control circuits 51a or 54a transmits a voltage of + 12 V, the diodes d1 and d3 or the diodes d1 are respectively blocked and no current passes through the detector 53. On the other hand, when the planes corresponding to the control circuits 51a or 54a are addressed, these circuits transmit a voltage OV. The diode d2 is then blocked and a current circulates from the detector 53a to the control circuit 51a provided that the contact 52a is closed. There is thus detection of current in the detector 53a if the contact 52a is closed, and no current if the contact 52a is open, which permits the state of the contact 52a to be known.

Central processor commands are transmitted over intervention circuits 21. These circuits likewise monitor the validity of the intervention. A plurality of identical circuits ensure less down-time for the central processor.

Figure 8:
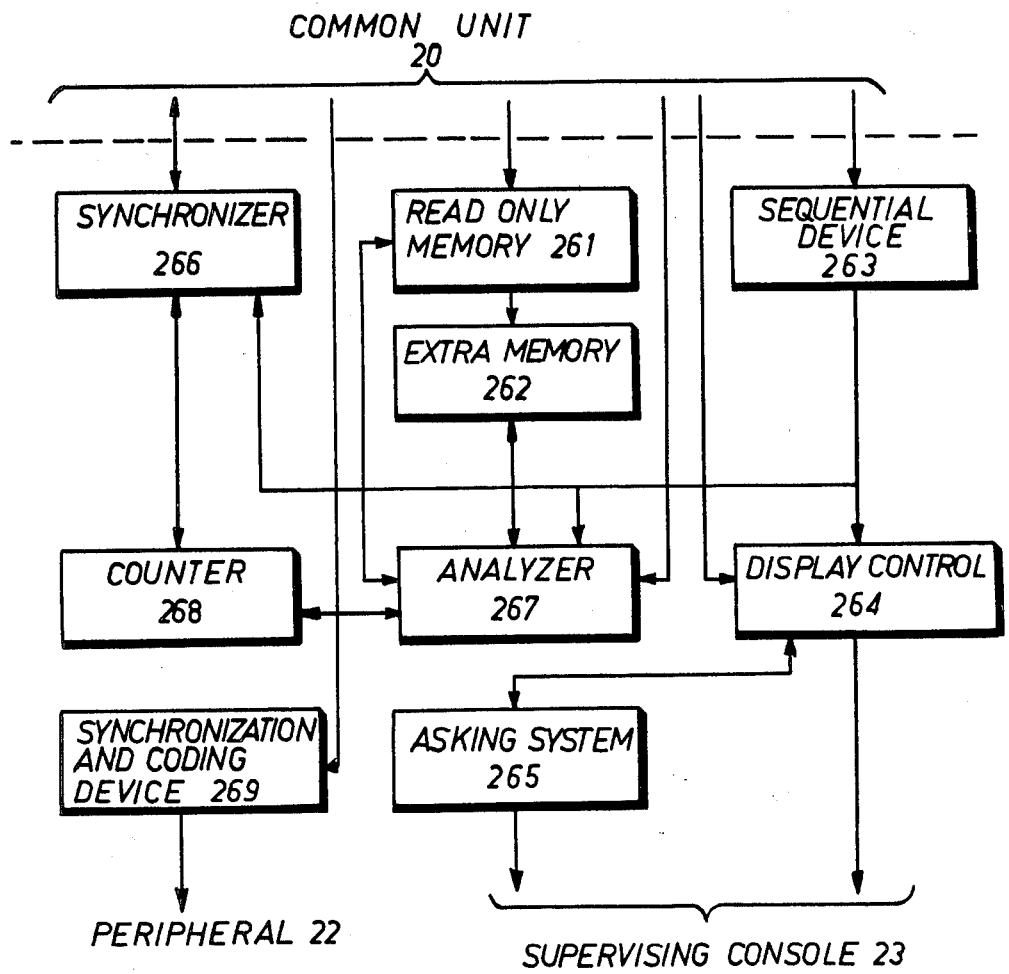
FIG. 8 shows diagrammatically a statistical traffic-observation member included in an installation according to the invention.

With reference to FIG. 8, the statistical traffic monitoring system 26, in close relation with the memory of the central processor makes it possible to establish, following a program stored by the peripheral equipment 18, the list of observations and counts to be carried out.

The accounts observed by the statistical traffic observation device are of three types. They can:

measure the instantaneous state of a position of members, for example the number of incoming calls waiting on one type of station;

take into account changes of state, for example the total number of incoming call connection;

take into account the periodic observations, for example of the occupied times of one type of line.

The statistical traffic monitoring system 26 comprises a read only memory 261, an additional memory 262, a sequential register 263, a control device for the display 264, an interrogation system 265, a synchronization device 266, an analysis device 267, a counter 268 and a coding and synchronizing device 269.

The read only memory 261 may be of any known type, for example with semi-conductors. In this memory are stored the programs enabling the nature of the counting to be determined. The additional memory 262 is a random access memory of any known type, for example with semi-conductors, in which are entered the data useful for the programmed counting.

The sequential register 263 is a displacement register permitting the analysis device to control the accounts one after the other during the course of a cycle. During the interval of time corresponding to each position of the sequential register and therefore to an account, the following operations are effected:

Under the control of the program entered in the memory 261, the analysis device 267 receives the old data corresponding to the account considered, issuing from the central memory. It enters these in the counter 268.

Still under the control of the same program, which indicates the method of calculation, it carries out the calculation by reading the necessary information for carrying it out. This information is at memory addresses which are deduced from the account number.

It loads the counter 268 and emits the orders permitting the accounts and the display to be brought up to date.

The control device 264 for the display comprises essentially a memory in which is stored the inscription to be displayed; this inscription is transmitted to the supervision console 23 at the same time as a wipe-out order for the old inscription. The supervision console 23 will be described in more detail later.

The interrogation system 265 contains a memory and an address-comparison system. The number of the count selected from the supervision console 23 is fed to the memory. The address-comparison system compares the address at which the sequential register 263 is located with the address of the count entered in the memory. When these two addresses are identical, the display is initiated.

The synchronization device 266 compares the address at which the sequential register 263 is located with the exploration address of the central memory 202 of the central processor unit 20. When these two addresses are identical, the intervention may take place.

The analysis device 267 is constituted by a group of logic circuits cabled and recorded, which carry out the functions indicated under the control of the program recorded in the memory 261 and by utilizing the auxiliary memory 262.

The analysis device 267 receives the monitoring data present in the central memory 202 of the central processor 20, the contents of the additional memory 262 and the nature of the counting, stored in the read only memory 261. It carries out the calculation of the count, loads the counter 268, and causes the transmission of the contents of the counter 268 towards the central processor 20. The counter may be of any known type.

The coding and synchronization device 269 is a circuit of any known type permitting the adaptation between the format of the data stored in the memory 202 of the central processor 20 and the format of the control signals of the peripheral equipment 22.

In operation, the central processor unit 20 transmits all the orders and keeps up-to-date, in its central memory 202, the state of all the parts of the installation. Upon each intervention of the central processor 20, the traffic-monitoring system 26 enters in its additional memory 262 the data useful for the various programmed countings.

Cyclically, the traffic-monitoring system 26 carries out the counting required by the programs by utilizing the information stored in the memory 202 of the central processor 20 and in the additional memory 262, and inscribes the results in the central memory 202. The display on the supervision console 23 and the impressions on the peripheral equipment 22 are carried out in accordance with the information entered in the memory 202 of the central processor 20.

All the counts can be supervised cyclically or by addressing upon a supervising console 23 connected to statistical unit 26. Depending on the program, some or all of the counts made in this way can be picked up by a peripheral equipment 22 such as a teleprinter, a printer, a tape punch, or the like. All the counts can be programmed with a partial counter reset after each output, or with an integrating daily counter reset once a day at a fixed time, subsequent to a reading. The time for the readings is defined on a programmer hooked up to a master clock.

The counts performed by the traffic monitoring system may if required not be picked up on the peripheral unit, or be picked up in accordance with the program every multiple of 6 minutes, or be outputted once every twenty-four hours.

The supervision console 23 comprises a display device, a count selection device and an operating button unit. The display device, composed for example of display tubes, permits the visual indication of the state of the count selected.

The supervision desk 23 is the interface between the operator and the statistical traffic observation device. The operator controls this by conventional mechanical means for the selection of the account and for choosing the type of information which he desires to obtain.

The account selection device is composed of coding wheels with numbered positions for defining the account number which it is desired to observe. The coincidence between this number which is entered in the memory 262 and the address at which the sequential is located is observed by the system of comparison of the interrogation system 265. When the sequential arrives at the account corresponding to that selected by the operator, the display order is given.

The reply of the statistical device to the operator appears on the display desk composed for example of display tubes of any known type, permitting the operator to read the state of the account demanded.

The group of operating buttons comprises a button for putting the display tubes into service, a button for validating the count number displayed on the count-selection device, a presumption operating button, making it necessary in certain cases to depress two buttons simultaneously in order to carry out an operation, a button for manually effecting an hourly output of the traffic-monitoring counts, a button for manually effecting a daily output of the traffic-monitoring counts, a button for re-setting the clock to the time, and a button for liberating the display circuits.

With reference to FIG. 9, the junction units, links and stations constituting the peripheral circuits are observed by the the matrix assembly of the observation device 19. The changes of state of these circuits are recorded in the buffer memory of the test system.

At each position of exploration of the central memory defined by the clock, there is a comparison of the previous state of the element considered, read in the central memory, and of the present state read in the buffer memory.

If the states are different (this test is made by the logic circuits of the calculation unit, known as "logic of conformity" in FIGS. 9 and 10), there is a release of repetitive microprograms: search of recorders, numbering and evolution of the program position of the element entered in the central memory.

The release of the program corresponding to this evolution of the program position is then effected by the monitor for it is this which establishes the priorities between the programs.

FIG. 10 is a simplified flow-chart describing the connection of a junction unit to a station.

The matrix of the test system detects that a given junction unit is on call and following the process described in FIG. 9, the monitor releases the demand for connection of the junction unit to a station.

The buffer memory contains the information concerning the junction unit permitting the sub-program to enter the registers of the calculating unit, the category, the number of the junction unit and its position.

As a function of the category of the junction unit, the sub-program searches for a free station corresponding to the category of the junction unit, and which can thus be reached by this junction unit. For that purpose it will read in the central memory the number of the station which is the first to be taken in this category.

In fact, in each zone of the central memory, for example reserved to a junction unit, it is provided to indicate the station of the corresponding category which must be taken by this junction unit. This information is brought up to date as the exploitation proceeds. The sub-program enters in the calculating unit the number of the station, the link which reaches it and its position if this station is free. If it is not free, there are further tests with another station of the same category. If the station is free, its program position recorded in the memory, changes.

The sub-program then orders the search for a free link and enters its number in the link register of the calculation unit.

The information necessary for putting the connection demanded into position being collected, it is sent into the corresponding registers of the intervention circuits. The program positions change in the central memory, the registers of the central unit are emptied so as to be able to treat another program.

It goes without saying that changes and substitutions may be made in the preferred embodiment hereinbefore described with reference to the accompanying drawings, without departing from the scope of the invention as set forth in the appended claims.

TABLE

| PRIORITY NUMBER | NATURE OF PRIORITY |
|---|---|
| 1 | Waiting junctor No. 0 |
| 2 | Waiting junctor No. 1 |
| 3 | Non used priority |
| 4 | Non used priority |
| 5 | Junctor on calling |
| 6 | Non used priority |
| 7 | Presence of demand for holding |
| 8 | Presence of demand for keeping |
| 9 | Presence of call from a station |
| 10 | Presence of demand for double-call |
| 11 | Intervention of exchange position |
| 12 | Presence of demand for return from switching position |
| 13 | Presence of confirmation of switching position return |
| 14 | Presence of demand for keeping cancellation |
| 15 | Presence of demand for return after double-call |
| 16 | Presence of demand for return |
| 17 | Presence of demand for transfer |
| 18 | Non used priority |
| 19 | Presence of demand for line orientation |
| 20 | Non used priority |
| 21 | Presence of "returned overflow" on switching position |
| 22 | Presence of single overflow on switching position |
| 23 | Non used priority |
| 24 | Presence of cancellation of demand for return |
| 25 | Presence of cancellation of return confirmation |
| 26 | Presence of demand for liberation single-call |
| 27 | Presence of demand for liberation double-call |
| 28 | Demand for liberation single-call |
| 29 | Presence outgoing junctor call |
| 30 | Presence outgoing junctor double-call demand |
| 31 | Presence demand for double-call demand |
| 32 | Presence of demand for cancellation of double-call keeping |
| 33 | Non used priority |
| 34 | Non used priority |
| 35 | Presence of demand for refusal of single-call numbering |
| 36 | Presence of demand for refusal of |

TABLE-continued

| PRIORITY NUMBER | NATURE OF PRIORITY |
|---|---|
| | double-call numbering |

We claim:

1. An automatic telephone installation applicable to chronological call distributions, including:
   a plurality of identical inputs connected through junction units for call and enquiry to the input of a single connection network capable of making a plurality of connections at one time;
   a plurality of circuits of various elements, said various elements including recorders, switching position stations, operator stations and outgoing junction units, the inputs of which are respectively connected to the outputs of said connection network, the outputs from said various elements forming identical interface units between said connection network and output terminals of said installation;
   a central processor, comprising a memory with stored program connected to said input junction units, to said connection network and to said plurality of circuits.

2. An installation as claimed in claim 1, in which said central processor is connected to said input junction units and to said connection network by means of control circuits of relays of said input junction units, said control circuits constituted by address registers containing the address of the element to be controlled, an order register containing the nature of the order to be performed, decoding means which translate and verify the coded information which is read out of the registers to provide an information furnishing the real physical address of the element to be controlled, a read-only memory and logic circuits provided for the coordination of the operation of said control circuits of the relays, said control circuits being connected to the connection network through marking wires which transfer the said real physical address of the element to be controlled.

3. An installation as claimed in claim 1, further including control circuit monitoring and selecting means connected to the input junction units and the connection network and to said central processor, said monitoring means being formed by a matrix test circuit comprising diodes connected to the contacts to be monitored and detectors for translating the state of said contacts into the binary code.

4. An installation as claimed in claim 1, in which said central processor is programmed by means of an information transmitting periphery unit.

5. An installation as claimed in claim 1, further including a statistical traffic-monitoring means connected to the memory of said central processor and to the programming peripheral unit and also to a supervising console and to a peripheral unit for printing out data useful for overall system control.

6. An installation as claimed in claim 1, further including both way trunk lines connected to an input junction unit through an output junction unit which is itself monitored by said input junction unit.

* * * * *